(12) United States Patent
Zhang et al.

(10) Patent No.: US 9,983,321 B2
(45) Date of Patent: May 29, 2018

(54) SAFETY INSPECTION DETECTOR AND GOODS SAFETY INSPECTION SYSTEM COMPRISING SEALING MATERIAL FILLED BETWEEN AN OPENING ON A HOUSING AND THE END PORTION OF A DETECTION MODULE

(71) Applicants: Nuctech Company Limited, Beijing (CN); TSINGHUA UNIVERSITY, Beijing (CN)

(72) Inventors: Qingjun Zhang, Beijing (CN); Yuanjing Li, Beijing (CN); Zhiqiang Chen, Beijing (CN); Ziran Zhao, Beijing (CN); Yinong Liu, Beijing (CN); Yaohong Liu, Beijing (CN); Xiang Zou, Beijing (CN); Huishao He, Beijing (CN); Shuwei Li, Beijing (CN); Jianping Chang, Beijing (CN); Wenjian Zhang, Beijing (CN)

(73) Assignees: NUCTECH COMPANY LIMITED, Beijing (CN); TSINGHUA UNIVERSITY, Beijing (CN)

( * ) Notice: Subject to any disclaimer, the term of this patent is extended or adjusted under 35 U.S.C. 154(b) by 85 days.

(21) Appl. No.: 15/258,209

(22) Filed: Sep. 7, 2016

(65) Prior Publication Data
US 2017/0068003 A1     Mar. 9, 2017

(30) Foreign Application Priority Data

Sep. 7, 2015   (CN) .......................... 2015 1 0564447

(51) Int. Cl.
*G01T 7/00*     (2006.01)
*G01J 1/02*     (2006.01)

(52) U.S. Cl.
CPC .............. *G01T 7/00* (2013.01); *G01J 1/0271* (2013.01); *G01J 2001/0276* (2013.01)

(58) Field of Classification Search
CPC ......... G01J 1/0271; G01J 1/0276; G01T 7/00; G03B 17/00; G01N 33/383
(Continued)

(56) References Cited

U.S. PATENT DOCUMENTS

| 6,222,122 B1 * | 4/2001 | Davidson ............... H05K 5/062 |
| | | 174/554 |
| 2014/0093052 A1 | 4/2014 | Chupas et al. |
| 2014/0118986 A1 | 5/2014 | Suzuki et al. |

FOREIGN PATENT DOCUMENTS

| CN | 1779451 A | 5/2006 |
| CN | 201145673 Y | 11/2008 |

(Continued)

OTHER PUBLICATIONS

Great Britain Search Report dated Jan. 31, 2017 received in British Application No. 1615212.6.
(Continued)

*Primary Examiner* — Que T Le
(74) *Attorney, Agent, or Firm* — Scully, Scott, Murphy & Presser, P.C.

(57) ABSTRACT

The invention discloses a safety inspection detector and a goods safety inspection system. The safety inspection detector at least comprises a circuit board, a first housing, a second housing, a detection module and a connecting interface. The detection module and the connecting interface are mounted on the circuit board. The first housing is pressed and connected to a first surface of the circuit board, and the second housing is pressed and connected to a second surface of the circuit board. The first housing and the second housing can hermetically wrap the detection module and electronic devices on the circuit board, but bypass the connecting (Continued)

interface to realize leading-out and connection with related interconnected cables by utilizing the connecting interface. The housings can be used for sealing and protecting sensitive electronic devices in the detector, thus being moisture proof and preventing interference.

12 Claims, 6 Drawing Sheets

(58) Field of Classification Search
USPC .................................................. 250/551, 239
See application file for complete search history.

(56) References Cited

FOREIGN PATENT DOCUMENTS

| CN | 102749343 A | 10/2012 |
| CN | 104089944 A | 10/2014 |
| CN | 205038170 U | 2/2016 |
| EP | 2 677 845 A1 | 12/2013 |
| GB | 2 110 037 A | 6/1983 |

OTHER PUBLICATIONS

China Security, "Present Situation and Application Prospect of Explosion-Proof Safety Technology", *Tongfang Weisan Technology Co. Ltd.*, 9$^{th}$, 1-12, pp. 36-39 (Sep. 1, 2009), together with an English-language abstract.

* cited by examiner

SAFETY INSPECTION DETECTOR AND GOODS SAFETY INSPECTION SYSTEM COMPRISING SEALING MATERIAL FILLED BETWEEN AN OPENING ON A HOUSING AND THE END PORTION OF A DETECTION MODULE

CROSS-REFERENCE TO RELATED APPLICATIONS

This application is based upon and claims priority to Chinese Patent Application 201510564447.6, filed on Sep. 7, 2015, the whole contents thereof are incorporated herein by reference.

TECHNICAL FIELD

The present disclosure relates to radiation detection technology, and more particularly, to a safety inspection detector using a seal structure and a goods safety inspection system.

BACKGROUND

Compared with the traditional large-scale container security system, a small-scale goods baggage security inspection system (briefly called "goods machine"), as a civilian security product, appears more complex and diverse working environment, thereby the detector as its core component should have an excellent environmental adaptation. In the past, some goods machine manufacturers sealed the L-shaped detector case (a detector is mounted therein), and added a desiccant into the L-shaped detector case for moisture proofing. Afterwards, since the cost of the goods machine inspection system is taken into consideration, it is generally required that the detector has a determined moisture proof capability to reduce the cost of designing and manufacturing the L-shaped detector. Therefore, the goods machine detector manufacturers improve moisture proofing, dust proofing and salt mist proofing ("three-proofing") of the detector by brushing three-proofing liquids thereon, which, however, brings problems of physical protection and safety for the operators. Recently, a low pressure chemical deposition method is used for depositing a poly-p-xylene film. The poly-p-xylene film has excellent three-proofing capability, but its operation is complex, and the device for applying the method is expensive, and the cost is high, so that the method is very difficult to be popularized in civilization three-proofing.

SUMMARY

In order to solve the aforementioned problems of the prior art, an object of the disclosure is to provide a goods machine detector using a new type of seal structure. Such goods machine detector not only improves the electronics weather resistance and anti-interference capability, but also effectively improves the weather resistance of the detector, as well as reduces low-energy scatter and the three-proofing technology requirements of the circuit board, and is easy to be maintained.

In order to attain the aforementioned object of the disclosure, the technical solution of the disclosure can be achieved by means of the following methods:

An embodiment of the disclosure provides a safety inspection detector including a circuit board, a detection module and a connecting interface, the detection module being mounted on a first surface or a second surface of the circuit board, and the connecting interface being mounted on the first surface of the circuit board, wherein the safety inspection detector further includes a first housing and a second housing, wherein the first housing is pressed and connected to the first surface of the circuit board, and a seal structure is formed on a contact surface of an edge of the first housing contacting with the first surface of the circuit board; electronic devices on the circuit board are sealed between the first housing and the circuit board; and the first housing has an inwardly concave notch that corresponds to the connecting interface, so as to expose the connecting interface; the second housing is pressed and connected to a second surface of the circuit board, and another seal structure is formed on a contact surface of an edge of the second housing contacting with the second surface of the circuit board; the detection module is sealed between the first housing and the circuit board and/or between the second housing and the circuit board; an opening is provided on the first housing and/or the second housing, and at least one end portion of the detection module is located at the opening; and sealing material is filled between the opening and the end portion of the detection module.

In comparison with the prior art, the advantage of the disclosure is that: the detector includes electronic readout circuit boards corresponding to high and low energy detectors; the sensitive electronic devices in the detector can be sealed and protected by the housing, being moisture proof and preventing interference. Meanwhile, since the external interface of the original detector will not change, a detector case in the safety inspection system does not need to be modified, and the circuit board of the detector does not need to be re-designed. On the premise of lowering modification cost, the use effect of the detector can be greatly improved.

According to one embodiment of the disclosure, a layer of metallic coating is comprised on the circuit board, and the first housing is a metallic housing, and the metallic coating and the first housing form an airtight shielded enclosure, to prevent the electronic devices on the circuit board from being affected by external radiation.

According to one embodiment of the disclosure, the first housing and the second housing each comprises a main body and a side wall which is formed by extending the main body from its edge towards the circuit board; and an end face of the side wall is hermetically connected with the circuit board; and the main body, the side wall and the circuit board surround a hermetic space together.

According to one embodiment of the disclosure, the second housing also has an inwardly concave notch, and both the first housing and the second housing present a U shape, and the notches extend over a certain distance from a side edge towards middle portions of the first housing and the second housing respectively.

According to one embodiment of the disclosure, the side walls of the first housing and the second housing are respectively provided with a plurality of vertical through-holes which are arranged separately, and the circuit board is also provided with corresponding through-holes; the through-holes of the first housing, the circuit board and the second housing are arranged in alignment; the contact surfaces of the circuit board contacting with the first housing and the second housing are flat portions, and a gasket is disposed between the side walls of the first housing and the second housing and the circuit board; and a plurality of fasteners pass through the through-holes of the first housing, the circuit board and the second housing in sequence, and the first housing, the circuit board and the second housing are pressed and hermetically connected with each other.

According to one embodiment of the disclosure, a seal groove is formed in the end face of the side wall, and the gasket is fixed in the seal groove, and the thickness of the gasket is larger than the depth of the seal groove; and the through-holes opened in the side wall are all located in the seal groove, and the gasket is opened with corresponding through-holes.

According to one embodiment of the disclosure, inner portions of the first housing and the second housing are separated as a first chamber and a second chamber respectively, and the first chamber presents a U shape corresponding to the electronic devices on the circuit board; the second chamber corresponds to the detection module; and the first chamber and the second chamber are separated by one section of the side wall therebetween, and a lower edge of the side wall is hermetically pressed against the circuit board.

According to one embodiment of the disclosure, the second chambers of the first housing and the second housing presents a cuboid shape, and each of the first housing and the second housing is provided with one opening on each of two end faces of the second chamber, and the two openings on the second chamber are located respectively on two sections of the side wall which are parallel with each other; and the openings on corresponding two ends of the detection module also respectively comprise two end portions which are located in the corresponding openings.

According to one embodiment of the disclosure, the main body of the first housing is provided with at least one glue injecting hole, which corresponds to a position of the second chamber of the first housing.

According to one embodiment of the disclosure, the side wall outside of the second housing is provided with at least one glue injecting hole, which corresponds to a position of the second chamber of the second housing.

According to one embodiment of the disclosure, the second housing is made of insulation materials.

In addition, the embodiment further provides a goods safety inspection system including a detector case, and the detector case is mounted with a plurality of the safety inspection detectors as above described.

In comparison with the prior art, the advantageous effect of the disclosure at least is that: electronic devices in the detector according to the embodiments of the disclosure are shielded by a metal housing, and the gasket for sealing is inserted between the metal housing and a data collecting board, in this way, both anti-interference ability in electronics and weather resistance can be improved. The detector portion of the detection module has a housing made of polycarbonate, and the opening portions on both ends are sealed off by sealant, such that weather resistance of the detector can be improved, low-energy scattering is reduced effectively, three-proofing technology requirements of the circuit board is largely lowered, and easy disassembly and maintain can be achieved, and cost of maintenance is also saved.

BRIEF DESCRIPTION OF THE DRAWINGS

The aforementioned and other characters and advantages of the disclosure will be more apparent by means of detailed description of exemplary embodiments thereof in connection with the accompanying drawings.

DETAILED DESCRIPTION

Figure 1:
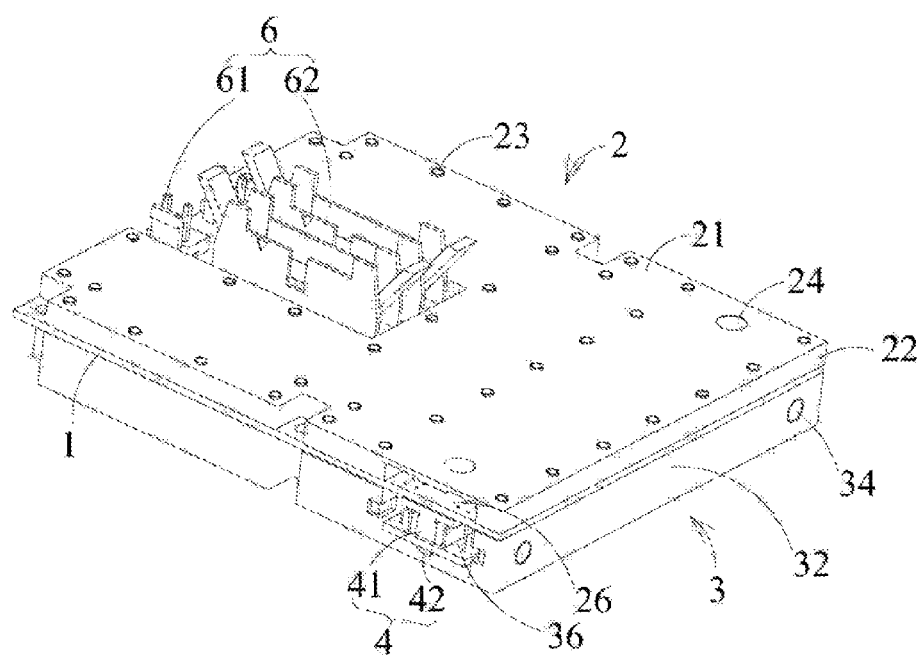
FIG. 1 is an isometric side view of a safety inspection detector according to an embodiment of the disclosure.

In the following, exemplary embodiments will be described in detail in combination with the drawings. The exemplary embodiments can be implemented in various forms, and the disclosure should not be construed as limiting these embodiments listed herein. Instead, the disclosure will be explained more comprehensively and integrately by providing these embodiments, and the conception of the exemplary embodiments can be completely conveyed to those skilled in the art.

The features and structures described herein can be combined within one or more embodiment in any suitable manner. In the following description, specific details are provided so that the implementations of the disclosure can be understood sufficiently. However, those skilled in the art should understand that the technical solutions of the disclosure may also be practiced without one or more specific details or may be practiced by employing other methods or elements. In other cases, structures or operations which are well known will not be illustrated or described in detail in order to avoid obscuring the disclosure.

As shown in FIGS. 1 to 6, an embodiment of the disclosure provides a safety inspection detector used in a goods safety inspection system. The safety inspection detector at least includes a circuit board 1 (also named as "data collecting board"), a first housing 2, a second housing 3, a detection module 4 and a connecting interface 6. The detection module 4 and the connecting interface 6 are mounted on the circuit board 1. The first housing 2 is pressed and connected to a first surface of the circuit board 1, and the second housing 3 is pressed and connected to a second surface of the circuit board 1. The first housing 2 and the second housing 3 can hermetically wrap the detection module 4 and electronic devices 11 on the circuit board 1, but bypass the connecting interface 6, so as to lead out and connect with the related interconnected cables by utilizing the connecting interface 6. The connecting interface 6 may include a pair of power connectors 61 and a pair of control signal connectors 62.

In this way, the housings can be used for hermetically protecting the sensitive electronic devices 11 in the detector, thus be moisture proof and prevent interference. Meanwhile, since the external interface of the original detector will not change, a detector case in the safety inspection system does not need to be modified, and the circuit board of the detector does not need to be re-designed. On the premise of lowering modification cost, the use effect of the detector can be greatly improved. A research shows that the electronic devices 11 in the detector are very sensitive. Detecting data and analyzing image may change significantly due to moisture and electromagnetic radiation (a large amount of the electromagnetic radiation comes from a power interface of the detector or an external ray source), so that the stability of the circuit board of the detector will be improved largely if the moisture and the electromagnetic radiation are prevented effectively.

The design idea of the disclosure is different from that of the existing electrical equipment housing. Generally, the electrical equipment housing is formed by mating two housings directly so as to seal a circuit board integrally between the two housings. In an embodiment of the disclosure, the first housing 2 and the second housing 3 are used to seal with the first surface and the second surface of the circuit board 1, respectively. The housings may be divided into a plurality of compartments inside themselves, and can seal in sections or in compartments. Even if one sealing space is invalid, the sealing effect of the other sealing spaces will not be affected. Thus, the sealing reliability is improved substantially.

Figure 2:
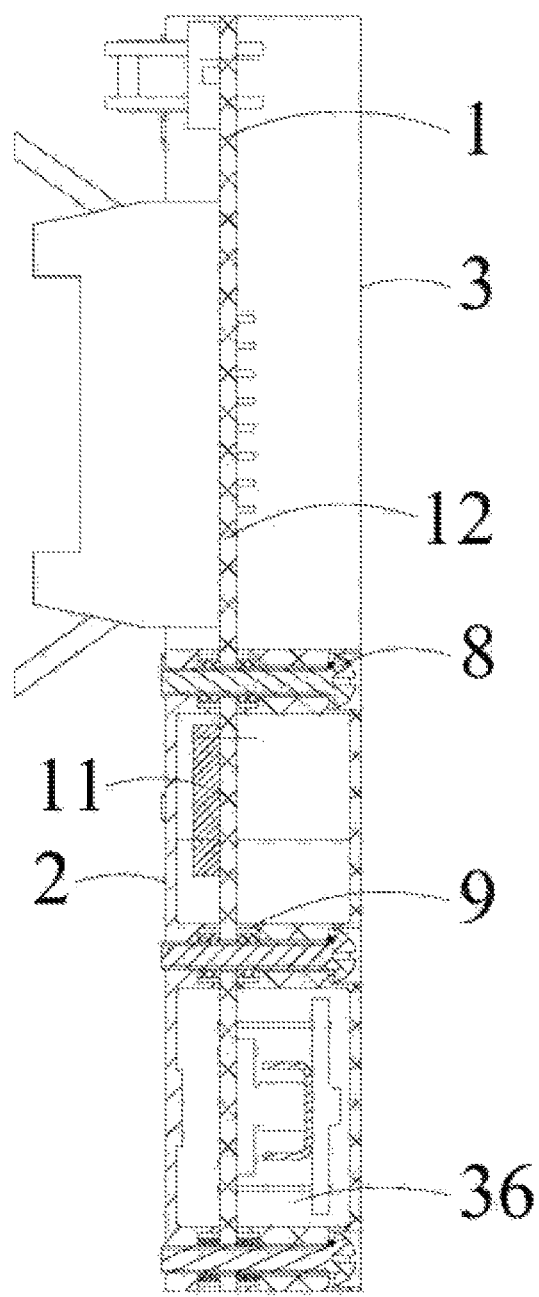
FIG. 2 is a side sectional view of the safety inspection detector according to the embodiment of the disclosure.

As shown in FIGS. 1 and 2, in an embodiment of the disclosure, the circuit board 1 has a rectangular shape and includes the first surface and the second surface. A plurality of the electronic devices 11 used by the detector may be arranged on the first surface, and welding legs of the electronic devices 11 are normally located at the corresponding positions on the second surface. Further, a circuit layer is printed on the first surface and a layer of metallic coating may be included on the first surface. Normally, the layer of metallic coating may be grounding copper-clad layer of the circuit board. In this way, the first housing 2 is a metallic housing, and the metallic coating in the circuit board 1 and the first housing 2 form an airtight shielded enclosure, which can prevent the electronic devices 11 on the circuit board 1 from being affected by external radiation.

Figure 3:
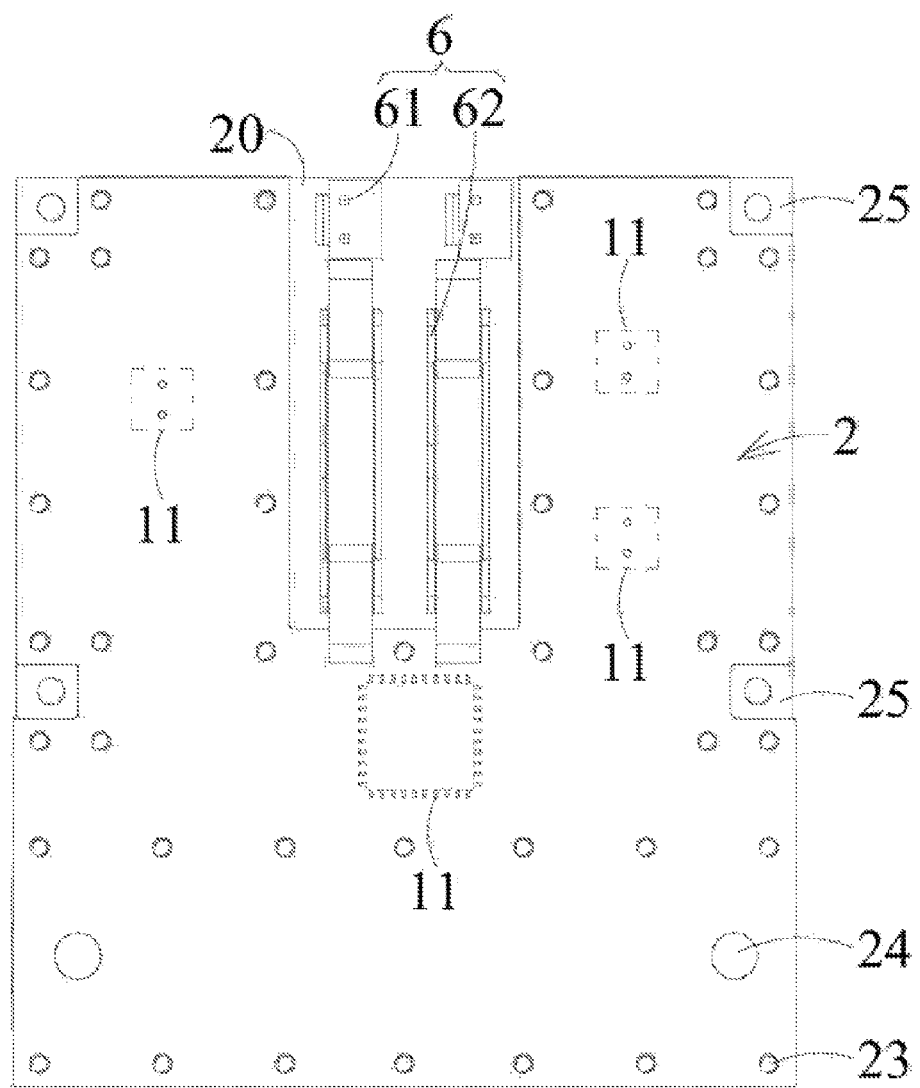
FIG. 3 is a left view of FIG. 2.
Figure 5:
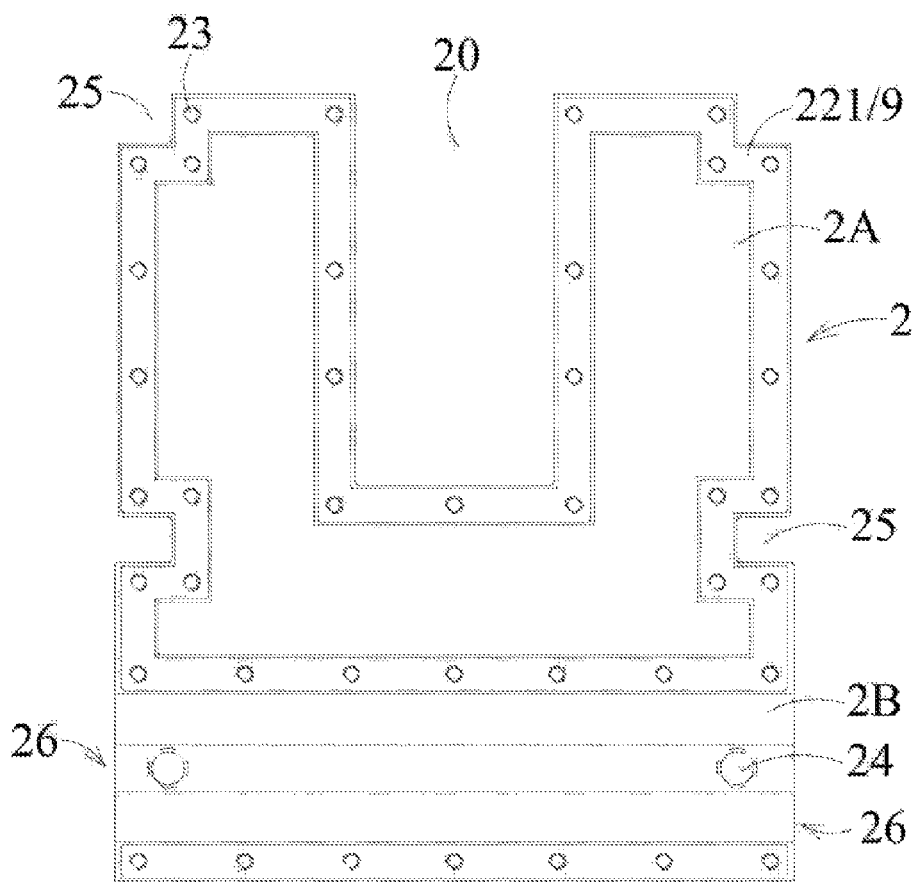
FIG. 5 is a structural schematic diagram of a first housing of the safety inspection detector according to the embodiment of the disclosure.

As shown in FIGS. 1, 3 and 5, in an embodiment of the disclosure, the first housing 2 includes a main body 21 and a side wall 22 which is formed by extending the main body 21 from its edge towards the circuit board 1. A plurality of sections of the side wall 22 around the edge of the main body 21 form an annular shape. In the present embodiment, the main body 21 and the side wall 22 of the first housing 2 are formed integrally by (but not limit to) punching or forging a metal plate. In addition, an end face of the side wall 22 is hermetically connected with the first surface of the circuit board 1, and the main body 21, the side wall 22 and the circuit board 1 surround a hermetic space together, so as to seal the electronic devices 11 on the circuit board 1.

As shown in FIG. 5, the plurality of the sections of the side wall 22 on the first housing 2 run inwardly to form an inwardly concave notch 20. The notch 20 extends over a certain distance from a side edge towards a middle portion of the first housing 2. Thus, the first housing 2 as a whole presents a U shape. The notch 20 corresponds to a position of the connecting interface 6, so as to expose the connecting interface 6. An inner portion of the first housing 2 is further separated as a first chamber 2A and a second chamber 2B. The first chamber 2A presents a U shape, and correspondingly receives the electronic devices 11 on the circuit board 1. The second chamber 2B correspondingly receives the welding legs of the detection module 4. The first chamber 2A and the second chamber 2B are separated by one section of the side wall 22 therebetween. A lower edge of the side wall 22 is pressed and connected to the circuit board 1 as well.

In the present embodiment, the second chamber 2B of the first housing 2 presents a cuboid shape. The first housing 2 is provided with one opening 26 on each of two end faces of the second chamber 2B. The two openings 26 on the second chamber 2B are located on two sections of the side wall 22 which are parallel with each other, respectively. The detection module 4 presents an elongate shape and has two end portions. The two openings 26 are located as described above so that the end portions of the detection module 4 can be exposed by means of the two openings 26 on both ends. The detection module 4 may include a high energy detector 41 and a low energy detector 42.

Two glue injecting holes 24 are provided on the main body of the first housing 2 and correspondingly positioned near both ends of the second chamber 2B, so as to inject sealant into locations of the welding legs of the detection module 4 in the second chamber 2B. The material of the sealant may be selected from (but not limit to) epoxy resin, phenolic resin, organic silicon resin and unsaturated polyester resin.

Figure 4:
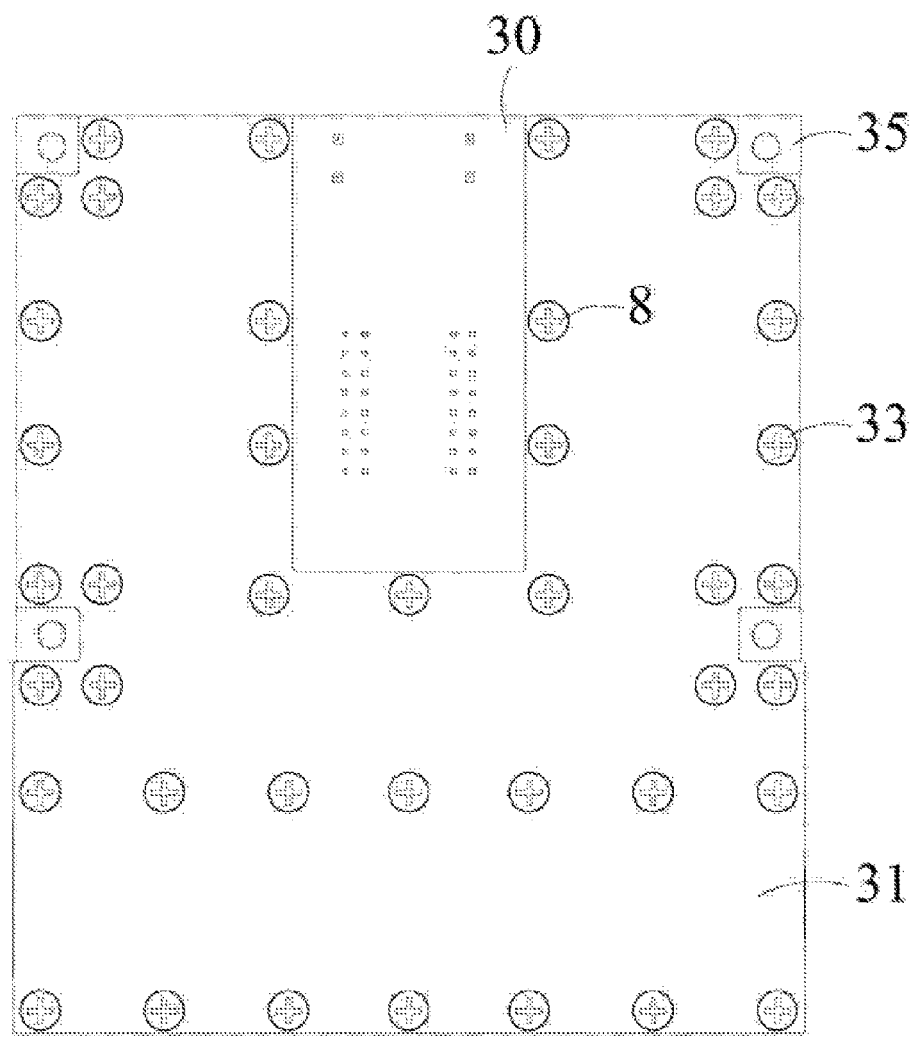
FIG. 4 is a right view of FIG. 2.
Figure 6:
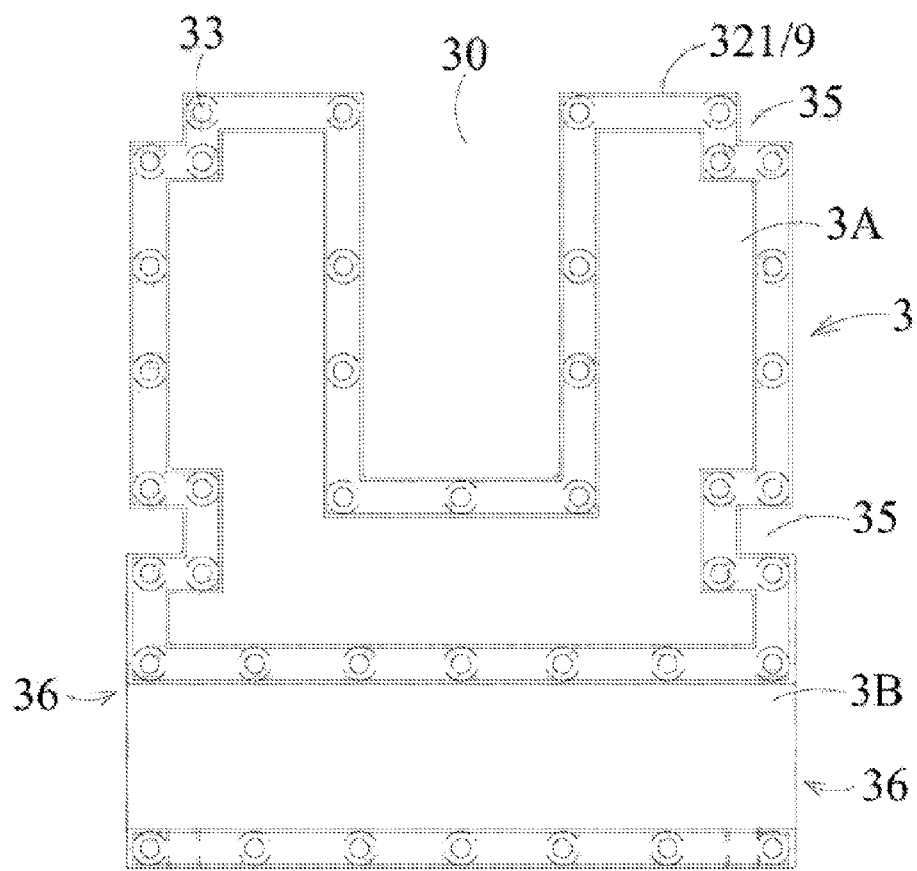
FIG. 6 is a structural schematic diagram of a second housing of the safety inspection detector according to the embodiment of the disclosure.

As shown in FIGS. 1, 4 and 6, the second housing 3 includes a main body 31 and a side wall 32 which is formed by extending the main body 31 from its edge towards the circuit board 1. A plurality of sections of the side wall 32 surrounding the edge of the main body 31 form an annular shape. In the present embodiment, the main body 31 and the side wall 32 of the first housing 2 are formed integrally with insulation material, for example, by injection molding with plastic (specifically, polycarbonate), but not limit to this. In addition, an end face of the side wall 32 is hermetically connected with the first surface of the circuit board 1, and the main body 31, the side wall 32 and the circuit board 1 enclose a hermetic space together, so as to seal the welding legs of the electronic devices 31 on the circuit board 1.

As shown in FIG. 6, the plurality of the sections of the side wall 32 on the second housing 3 run inwardly and form an inwardly concave notch 30. The notch 30 also presents a U shape. The notch 30 extends over a certain distance from a side edge towards a middle portion of the second housing 3. An inner portion of the second housing 3 is also separated as a first chamber 3A and a second chamber 3B. The first chamber 3A also presents a U shape, and correspondingly receives the welding legs of the electronic devices 11 on the circuit board 1. The second chamber 3B correspondingly receives the detection module 4. The first chamber 3A and the second chamber 3B are separated by one section of side wall 32 therebetween. A lower edge of the side wall 32 is hermetically pressed against the circuit board 1.

The second chamber 3B of the first housing 2 also presents a cuboid shape. The second housing 3 is provided with one opening 36 on each of two end faces of the second chamber 3B. The two openings 36 on the second chamber 3B are located on two sections of the side walls 32 which are parallel with each other, respectively. Two end portions of the detection module 4 are located in the corresponding openings 36 respectively. In addition, at least one glue injecting hole 34 is provided on the side wall 32 outside the second housing 3 and corresponds to a position of the second chamber 3B of the second housing 3.

Sealing material is filled between the openings 26 or 36 and the end portions of the detection module 4, so as to seal both ends of the detector. The opening portions at both the ends of the detector are sealed off by easily operated sealant having a thickness of 3-5 mm formed by means of needle-injecting glue. The sealing material may be selected from (but not limit to) epoxy resin, phenolic resin, organic silicon resin and unsaturated polyester resin.

As shown in FIGS. 1-6, in the present embodiment, the side walls 22, 23 of the first housing 2 and the second housing 3 are extended and arranged in a totally identical way, so as to align and press against each other. The side walls 22, 23 of the first housing 2 and the second housing 3 are provided with a plurality of vertical through-holes respectively, the through-holes are arranged separately. The circuit board 1 is provided with corresponding through-holes. The through-holes on the first housing 2, the circuit board 1 and the second housing 3 are arranged in alignment. In addition, contact surfaces of the circuit board 1 contacting with the first housing 2 and the second housing 3 are flat portions, but bypass positions having structure or welding spots as possible. Seal grooves 221, 321 are formed in end faces of the side walls 22, 23. A gasket 9 is fixed in the seal grooves 221, 321, and the thickness of the gasket 9 is larger than the depth of the seal grooves. All of the through-holes 23, 33 opened in the side walls 22, 23 are located in the seal grooves 221, 321, and the gasket 9 is provided with corresponding through-holes.

The gasket 9 occupies positions between the side walls 22, 32 of the first housing 2 and the second housing 3 and the circuit board 1. A plurality of fasteners 8 pass through the through-holes of the first housing 2, the circuit board 1 and the second housing 3 in sequence, such that the first housing 2, the circuit board 1 and the second housing 3 are pressed and hermetically connected to one another. The fasteners 8 may be chosen as (but not limit to) a bolt and a nut.

The first housing 2 and the second housing 3 may also be provided with a plurality of avoiding notches 25, 35, to avoid external fixed parts, such as screw holes in the circuit board 1, in order to prevent the external fixed parts from destroying tightness and leave original connection mode and usage mode unaffected.

The safety inspection detector provided in the embodiment of the disclosure may be mounted in an existing goods safety inspection system. Normally, a plurality of detectors may be mounted in an L-shaped detector box. The original detector case does not need to be modified or does not need a moisture proofing treatment.

The safety inspection detector with a sealed structure according to above technical solutions seals and shields the detectors and their electronic devices 11 wholly, to improve its anti-interference ability and environmental suitability. Comparing with the traditional detector which takes a three-proofing treatment by applying three-proofing glue, the detectors of the disclosure are easy to maintain, and its economy is improved.

Example implementations of the disclosure are illustrated and described specifically. It should be understood that the disclosure is not limited to the implementations disclosed herein. On the contrary, the disclosure intends to cover various modifications and equivalents within the scope of the appended claims.

What is claimed is:

1. A safety inspection detector comprising a circuit board, a detection module and a connecting interface; the detection module being mounted on a first surface or a second surface of the circuit board; and the connecting interface being mounted on the first surface of the circuit board, wherein the safety inspection detector further comprises a first housing and a second housing, wherein the first housing is pressed and connected to the first surface of the circuit board, and a seal structure is formed on a contact surface of an edge of the first housing contacting with the first surface of the circuit board; electronic devices on the circuit board are sealed between the first housing and the circuit board; and the first housing has an inwardly concave notch that corresponds to the connecting interface, so as to expose the connecting interface;

the second housing is pressed and connected to a second surface of the circuit board, and another seal structure is formed on a contact surface of an edge of the second housing contacting with the second surface of the circuit board; the detection module is sealed between the first housing and the circuit board and/or between the second housing and the circuit board; an opening is provided on the first housing and/or the second housing, and at least one end portion of the detection module is located at the opening; and sealing material is filled between the opening and the end portion of the detection module.

2. The safety inspection detector according to claim 1, wherein a layer of metallic coating is comprised on the circuit board, and the first housing is a metallic housing, and the metallic coating and the first housing form an airtight shielded enclosure, to prevent the electronic devices on the circuit board from being affected by external radiation.

3. The safety inspection detector according to claim 1, wherein the first housing and the second housing each comprises a main body and a side wall which is formed by extending the main body from its edge towards the circuit board; and an end face of the side wall is hermetically connected with the circuit board, and the main body, the side wall and the circuit board surround a hermetic space together.

4. The safety inspection detector according to claim 1, wherein the second housing also has an inwardly concave notch, and both the first housing and the second housing present a U shape, and the notches extend over a certain distance from a side edge towards middle portions of the first housing and the second housing, respectively.

5. The safety inspection detector according to claim 3, wherein the side walls of the first housing and the second housing are respectively provided with a plurality of vertical through-holes, which are arranged separately, and the circuit board is provided with corresponding through-holes; the through-holes on the first housing, the circuit board and the second housing are arranged in alignment; the contact surfaces of the circuit board contacting with the first housing and the second housing are flat portions, and a gasket is disposed between each of the end faces of the side walls of the first housing and the second housing and the circuit board; and a plurality of fasteners pass through the through-holes of the first housing, the circuit board and the second housing in sequence, and the first housing, the circuit board and the second housing are pressed and hermetically connected to one another.

6. The safety inspection detector according to claim 5, wherein a seal groove is formed in the end face of the side wall, and the gasket is fixed in the seal groove, and the thickness of the gasket is larger than the depth of the seal groove; and the through-holes opened in the side wall are all located in the seal groove, and the gasket is opened with corresponding through-holes.

7. The safety inspection detector according to claim 1, wherein inner portions of the first housing and the second housing are separated as a first chamber and a second chamber respectively, and the first chamber presents a U shape and corresponds to the electronic devices on the circuit board; the second chamber corresponds to the detection module;

and the first chamber and the second chamber are separated by one section of the side wall therebetween, and a lower edge of the side wall is hermetically pressed against the circuit board.

8. The safety inspection detector according to claim 7, wherein the second chambers of the first housing and the second housing each presents a cuboid shape, and each of the first housing and the second housing is provided with one opening on each of two end faces of the second chamber, and the two openings on the second chamber are located on two sections of the side wall which are parallel with each other, respectively; and the openings on corresponding two ends of the detection module also respectively comprise two end portions which are located in the corresponding openings.

9. The safety inspection detector according to claim 7, wherein the main body of the first housing is provided with at least one glue injecting hole, which corresponds to a position of the second chamber of the first housing.

10. The safety inspection detector according to claim 7, wherein the side wall outside of the second housing is provided with at least one glue injecting hole, which corresponds to a position of the second chamber of the second housing.

11. The safety inspection detector according to claim 1, wherein the second housing is made of an insulation material.

12. A goods safety inspection system having a detector case, wherein the detector case is mounted with a plurality of the safety inspection detector according to claim 1.

* * * * *